(12) United States Patent
Al Otaibi (10) Patent No.: US 10,877,494 B2
(45) Date of Patent: Dec. 29, 2020

(54) DEPRESSURIZING A BRANCH PIPE

(71) Applicant: Saudi Arabian Oil Company, Dhahran (SA)

(72) Inventor: Abdulaziz M. Al Otaibi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 50 days.

(21) Appl. No.: 16/405,031

(22) Filed: May 7, 2019

(65) Prior Publication Data

US 2020/0356121 A1 Nov. 12, 2020

(51) Int. Cl.
*G05D 16/04* (2006.01)
*F16L 41/02* (2006.01)

(52) U.S. Cl.
CPC ............ *G05D 16/04* (2013.01); *F16L 41/021* (2013.01)

(58) Field of Classification Search
CPC ................................ G05D 16/04; F16L 41/021
USPC ........................................................ 137/205.5
See application file for complete search history.

(56) References Cited

U.S. PATENT DOCUMENTS

| | | | | |
|---|---|---|---|---|
| 2,227,646 A | * | 1/1941 | Hillmann | ............... B05B 7/28 137/238 |
| 6,966,328 B2 | * | 11/2005 | Benham | ............... F15D 1/14 137/101.11 |
| 2007/0107706 A1 | | 5/2007 | Berggren et al. | |
| 2016/0200506 A1 | * | 7/2016 | Sisk | ............... B65D 88/28 251/145 |
| 2019/0093604 A1 | | 3/2019 | Hampson et al. | |

FOREIGN PATENT DOCUMENTS

| | | |
|---|---|---|
| CN | 206495829 | 6/2017 |
| GB | 2356223 | 5/2001 |
| JP | H10141299 | 5/1998 |
| RU | 2412336 | 8/2009 |

OTHER PUBLICATIONS

PCT International Search Report and Written Opinion in International Appln. No. PCT/US2020/031838, dated Jul. 29, 2020, 16 pages.

* cited by examiner

*Primary Examiner* — Kevin L Lee
(74) *Attorney, Agent, or Firm* — Fish & Richardson P.C.

(57) ABSTRACT

A method for depressurizing a pipe includes forming, by an ejector assembly, a seal between a first pipe and a second pipe fluidically coupled to the tee pipe fitting. The first pipe flows a first fluid at a first pressure, and the second pipe flows a second fluid at a second pressure lower than the first pressure. The ejector assembly includes a nozzle converging along a flow direction of the first fluid flowing in the first pipe, and a mixing chamber at an outlet of the nozzle, the mixing chamber comprising an outlet is in fluid communication with the second pipe. The method also includes flowing the first fluid from the first pipe into the ejector assembly through the nozzle so that the pressure of the first fluid decreases to a third pressure lower than the second pressure to draw the second fluid into the mixing chamber.

20 Claims, 5 Drawing Sheets

DEPRESSURIZING A BRANCH PIPE

FIELD OF THE DISCLOSURE

This disclosure relates to changing the direction of fluids flowing inside piping, for example, inside a tee pipe fitting. More specifically, this disclosure relates to depressurizing a branch pipe of a tee pipe fitting.

BACKGROUND OF THE DISCLOSURE

Some pipes under high pressure need to be depressurized. Some pipes are depressurized by using gas flaring methods or by discharging the fluid into sum pits. Some fluids can be harming to the environment. Methods and systems for improving the process of depressurizing pipes are sought.

SUMMARY

Implementations of the present disclosure include a method that includes forming, by an ejector assembly and inside a tee pipe fitting, a seal between a first pipe and a second pipe fluidically coupled to the tee pipe fitting, the first pipe flowing a first fluid at a first pressure, the second pipe flowing a second fluid at a second pressure lower than the first pressure. The ejector assembly includes a nozzle converging along a flow direction of the first fluid flowing in the first pipe, and a mixing chamber at an outlet of the nozzle, the mixing chamber including an outlet that, with the seal formed, is in fluid communication with the second pipe. The method also includes flowing the first fluid from the first pipe into the ejector assembly through the nozzle, wherein the first pressure of the first fluid decreases to a third pressure lower than the second pressure drawing the second fluid from the second pipe into the mixing chamber.

In some implementations, forming the seal includes moving, by a moving assembly, the ejector assembly from a first position inside an ejector housing to a second position at an interface between the first pipe and the second pipe to form the seal, the ejector housing extending away from the first pipe adjacent the interface.

In some implementations, the ejector assembly is, in the first position, fluidically decoupled from the first fluid in the first pipe.

In some implementations, moving the ejector assembly from the first position to the second position includes actuating the moving assembly from outside the ejector housing.

In some implementations the mixing chamber includes a first sealing ring and an inlet of the second pipe includes a second sealing ring, and wherein forming the seal includes engaging the first ring with the second ring.

In some implementations, flowing the first fluid into the ejector assembly includes opening a valve of the ejector assembly. In some implementations, opening the valve includes actuating a valve mechanism from outside the tee pipe fitting.

In some implementations, the method also includes, after drawing the second fluid from the second pipe into the mixing chamber, undoing the seal between the first pipe and the second pipe. In some implementations, undoing the seal includes isolating the second pipe interrupting the flowing of the first fluid into the ejector assembly, and moving the ejector assembly away from an interface between the first pipe and the second pipe.

Further implementations of the present disclosure include a system that includes an ejector moving gearbox assembly, and a movable ejector coupled to the ejector moving gearbox assembly. The ejector is configured to be moved by the ejector moving gearbox assembly to form a seal, inside a tee pipe fitting, between a first pipe and a second pipe fluidically coupled to the tee pipe fitting. The first pipe is configured to flow a first fluid at a first pressure and the second pipe is configured to flow a second fluid at a second pressure lower than the first pressure. The ejector includes a nozzle converging along a flow direction of the first fluid to decrease the pressure of the first fluid to a third pressure lower than the second pressure, and a mixing chamber at an outlet of the nozzle, the mixing chamber including an outlet that, with the seal formed, is in fluid communication with the second pipe such that flowing the first fluid from the first pipe through the nozzle to the mixing chamber draws the second fluid from the second pipe into the mixing chamber.

In some implementations, the system also includes a housing extending away from the first pipe adjacent the interface, the housing configured to house the ejector moving gearbox assembly.

In some implementations, the ejector housing extends orthogonally, with respect to the first pipe and the second pipe, away from the first pipe.

In some implementations, the system further includes a guiding rail inside the housing and configured to guide the outlet of the mixing chamber to an inlet of the second pipe to form the seal between the first pipe and the second pipe.

In some implementations, the ejector is movable between a first position, inside the housing, and a second position at an interface between the first pipe and the second pipe to form the seal.

In some implementations, the ejector is fluidically decoupled from the first fluid in the first pipe in the first position.

In some implementations, the ejector moving gearbox assembly includes a gearbox disposed inside the housing, the ejector moving assembly configured to be actuated, through the gearbox, from outside the housing to move the ejector.

In some implementations, the ejector moving gearbox assembly is configured to be actuated by applying torque, through the gearbox, to the ejector moving gearbox assembly, the torque applied by at least one of a motor and a handwheel.

In some implementations, the ejector moving gearbox assembly includes a threaded rod including a first end coupled to the ejector and a second end disposed inside and threadedly coupled to a threaded sleeve, the threaded sleeve rotatable about a longitudinal axis of the threaded rod to move the first end toward and away from the threaded sleeve.

In some implementations, the threaded sleeve is disposed inside a sealed casing, the sealed casing affixed to the ejector housing and including bearings configured to reduce rotational friction between the sealed casing and the threaded sleeve.

In some implementations, the movable ejector further includes a valve configured to open a channel for the first fluid to flow into the nozzle.

DETAILED DESCRIPTION OF THE DISCLOSURE

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations. For example, the implementations are described with reference to a tee pipe fitting. However, the disclosure can be implemented with any appropriate pipe fitting that connects two or more pipes flowing fluids of different pressures.

The present disclosure describes a system and method for depressurizing and draining a branch pipe of a tee pipe fitting by changing the direction of the fluid inside the branch pipe toward and into a main pipe of the tee pipe fitting. When the main pipe flows a high-pressure fluid and the branch pipe flows a low-pressure fluid, the high-pressure fluid from the main pipe flows into the branch pipe to pressurize the branch pipe. An ejector assembly forming a seal between the main pipe and the branch pipe can depressurize the branch pipe. For example, a nozzle of the ejector assembly can receive a portion of the high-pressure fluid and decrease the pressure of the high-pressure fluid. The nozzle can decrease the pressure of the high-pressure fluid to a pressure lower than the pressure of the low-pressure fluid in the branch pipe. When the fluid from the main pipe exits the nozzle at the new pressure, the low pressure at the exit of the nozzle can draw the low-pressure fluid from the branch pipe. As the low-pressure fluid is drawn into the ejector assembly, the low-pressure fluid mixes with the fluid of the main pipe to exit the ejector assembly into the main pipe.

Figure 1:
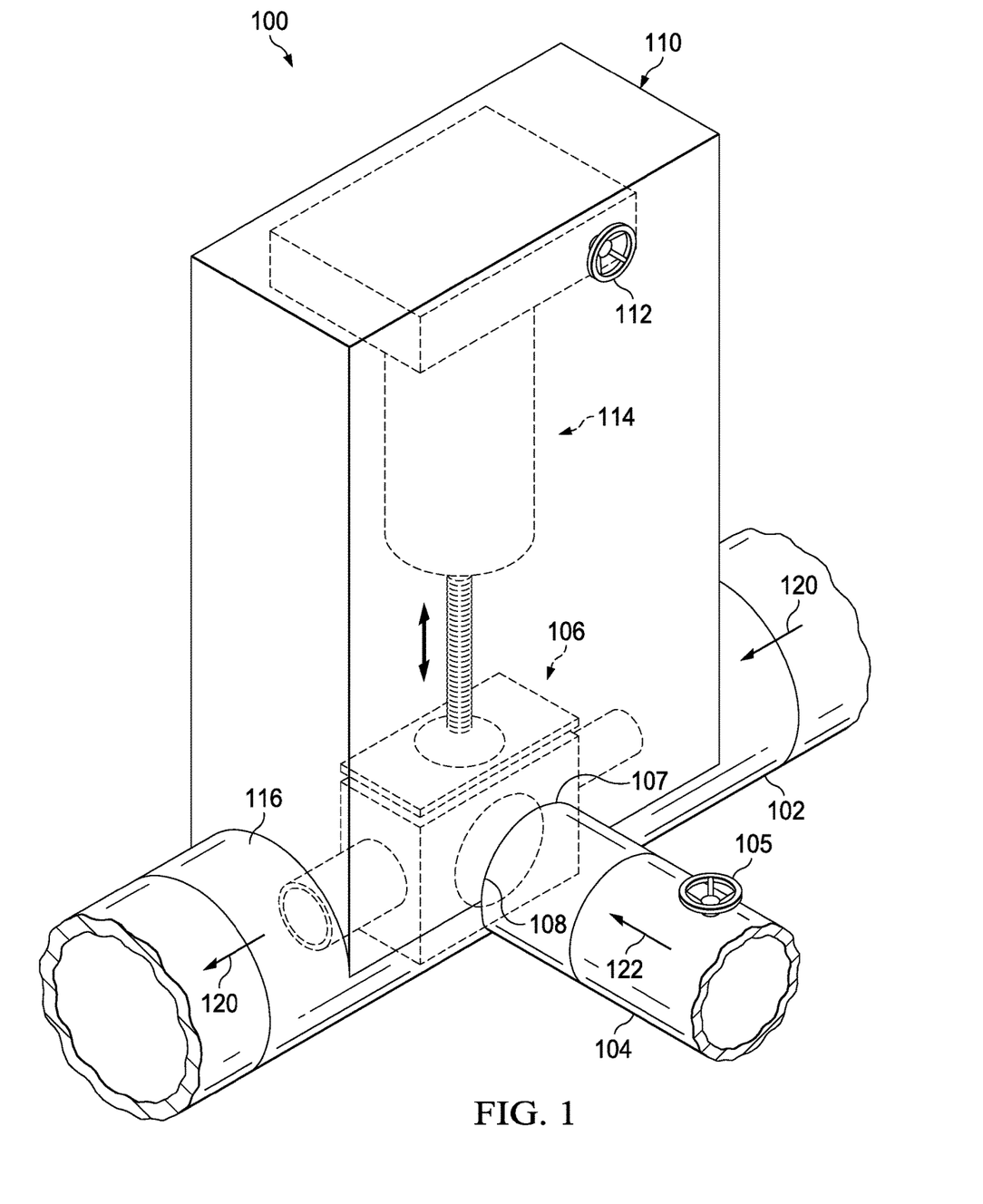
FIG. 1 is a perspective view of a depressurizing system according to implementations of the present disclosure.

Referring to FIG. 1, a method and system 100 for depressurizing a branch pipe 104 is shown. The depressurizing system 100 includes an ejector moving gearbox assembly 114 and a movable ejector assembly 106 (for example, an ejector or an injector) coupled to the ejector moving gearbox assembly 114. The moving assembly 114 is disposed inside a housing 110. The housing 110 is affixed to a tee pipe fitting 116 that is connected to a first pipe 102 (for example, a main pipe) and a second pipe 104 (for example, a branch pipe). The main pipe 102 and the branch pipe 104 are fluidically coupled to the tee pipe fitting 116. The depressurizing system 100 can be used to depressurize the branch pipe 104 without exposing a fluid 122 of the branch pipe 104 to the environment.

The housing 110 protects the moving assembly 114 and the other components inside the housing. The housing 110 extends away from the main pipe 102 adjacent an interface 108 between the main pipe 102 and the branch pipe 104 (for example, an inlet 107 of the branch pipe 104 and an outlet of the main pipe 102 form the interface 108). In the example shown in FIG. 1, the housing extends orthogonally, with respect to the main pipe 102 and the branch pipe 104, away from the main pipe 102. The housing 110 can be permanently affixed to the tee pipe fitting 116 or can be a part of the tee pipe fitting 116. In some implementations, the main pipe 102 and the branch pipe 104 can have different or similar diameters, with the main pipe 102 flowing a fluid of greater pressure than the fluid in the branch pipe 104.

The main pipe 102 has a first fluid 120 that flows in a first direction and the branch pipe 104 has a second fluid 122 that, with the ejector assembly 106 engaged, can flow toward the main pipe 102. For example, when the ejector assembly 106 is engaged with the interface 108 between the main pipe 102 and the branch pipe 104, the fluid 122 of the branch pipe 104 can flow in a direction toward the main pipe 102. For instance, the housing 110 can have a handwheel 112 or a similar component to control the moving assembly 114, which in turn moves the ejector assembly 106 to a position in which the branch pipe 104 can be depressurized. As further explained in detail below with respect to FIG. 2, the handwheel 112 is connected to the moving assembly 114. For example, the handwheel 112 is connected to a gearbox of the moving assembly 114. The moving assembly 114 moves the ejector assembly 106 to form a seal, inside the tee pipe fitting 116, between the main pipe 102 and the branch pipe 104. For example, the ejector assembly 106 can form a seal between the two pipes 102 and 104 by engaging the interface 108 at the inlet 107 of the branch pipe 104. By forming the seal and then flowing the first fluid 120 through the ejector assembly 106, a pressure differential inside the ejector assembly 106 can draw the second fluid 122 from the branch pipe 104 into the main pipe 102, depressurizing the branch pipe 104.

After the branch pipe 104 has been depressurized, the ejector assembly 106 can be disengaged from the interface 108 to undo the seal between the main pipe 102 and the branch pipe 104. To undo the seal, the branch pipe 104 can be isolated by closing a valve 105 of the branch pipe 104 before the ejector assembly 106 is removed from the interface 108. When the branch pipe 104 has been isolated such that the second fluid 122 does not flow into the tee pipe fitting 116, the flow of the first fluid 120 into the ejector assembly 106 can be interrupted by closing a valve of the ejector assembly 106. After the respective valves have been closed, the ejector assembly 106 can be moved away from an interface 108 to undo the seal and allow the first fluid 120 to flow through the tee pipe fitting 116.

As further discussed below with respect to FIGS. 2 and 3, the ejector assembly 106 is movable from an engaged position with the interface 108, to a disengaged position above the periphery of the main pipe 102 (for example, inside the ejector housing 110). When the ejector assembly 106 is inside the housing 110, the first fluid 120 can flow normally along the main pipe 102 and into the branch pipe 104. For example, the first fluid 120 in the main pipe 102 can have a first pressure and the second fluid 122 in the branch pipe 104 can have a second pressure lower than the first pressure. Such pressure differential causes the first fluid 120 in the main pipe 102 to flow into the branch pipe 104, increasing the pressure of the fluid in the branch pipe 104. For example, when the ejector assembly 106 is inside the housing (for example, the ejector assembly 106 is disengaged with the interface 108), the first fluid 120 can flow, without interference, to the branch pipe 104. When the pressure of the second fluid 122 is above a threshold, the depressurizing system 100 can be activated to depressurize the branch pipe 104.

Figure 2:
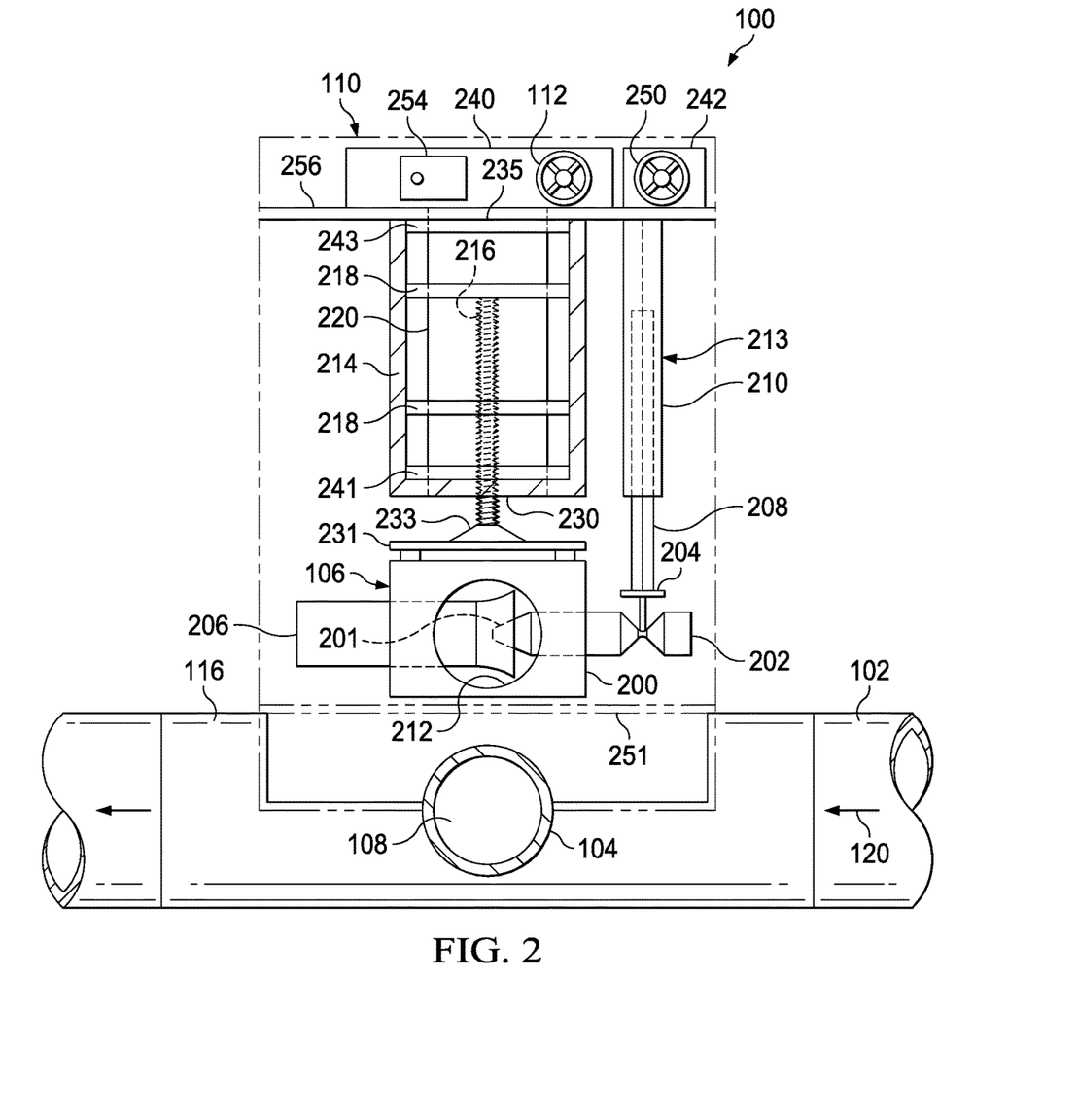
FIG. 2 is a front view of a depressurizing system with an ejector assembly in a first position.
Figure 3A:
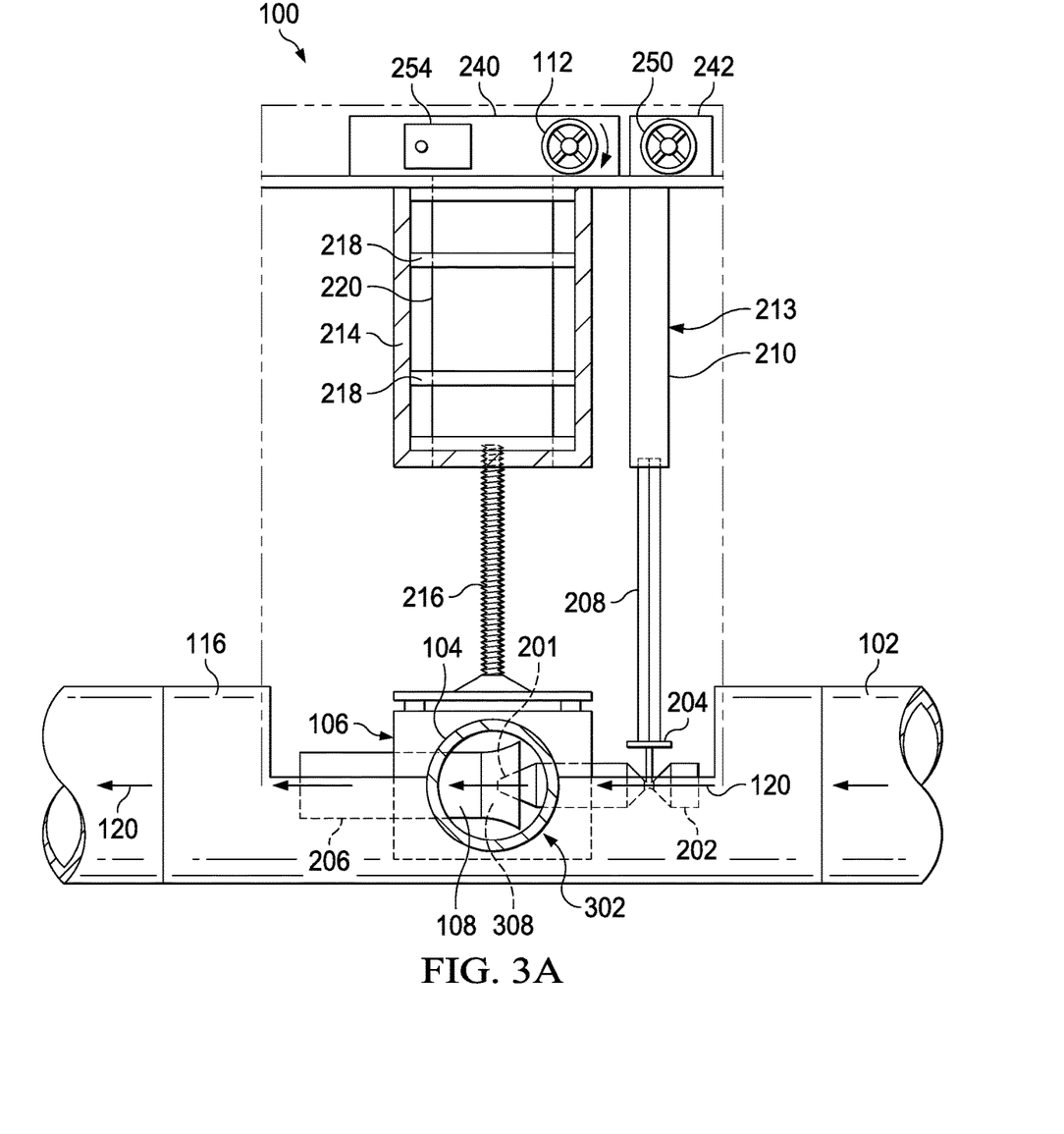
FIG. 3A is a front view of the depressurizing system of FIG. 2, with the ejector assembly in a second position.

FIGS. 2 and 3A show a front view of the depressurizing system 100 illustrating details of the ejector moving gearbox assembly 114 and of the ejector assembly 106 inside the housing 110. FIG. 2 shows the ejector assembly 106 in a first position inside the housing 110, and FIG. 3A shows the ejector assembly 106 in a second position at the interface 108 to form a seal 302. Referring to FIG. 2, the moving assembly 114 includes a first gearbox 240 and a second gearbox 242, a sealed casing 214, a first threaded sleeve 220 (for example, a wide metal sleeve) and a second threaded sleeve 210 (for example, a thin metal sleeve), a first threaded rod 216 and a second threaded rod 208, and an attachment plate 231 secured to the ejector assembly 106. The first gearbox 240 can be connected to an external handwheel 112 and to an external actuator 254 (for example, an electric motor). Either one of the handwheel 112 or the actuator 254 can apply torque to the gearbox which, in response, can transfer the torque onto the first threaded sleeve 220 to rotate the threaded sleeve 220. The actuator 254 can be activated by a manual switch or by an automatic mechanism. For example, a pressure sensor (not shown) can sense the pressure in the branch pipe 104 and transmit the pressure information to the actuator 254 for the actuator 254 to drive the gearbox 240, which in turn connects and disconnects the ejector assembly 106 from the interface 108.

The threaded sleeves 220 and 210 can be hollow tubes with their respective inner diameters having threads configured to threadedly connect with their respective threaded rods 216 and 208. The first threaded rod 216 is fixed to the attachment plate 231. As further described below with respect to FIG. 4, the ejector assembly 106 can be engaged with a guiding rail that prevents the ejector assembly 106 from rotating along the longitudinal axis (not shown) of the first threaded rod 216. Thus, the first threaded rod 216 is rotatably fixed with respect to the first threaded sleeve 220. As the first threaded sleeve 220 rotates, a first end 233 of the threaded rod 216 attached to the plate 231 moves away from the first threaded sleeve 220 to position the ejector assembly 106 at the interface 108. The first threaded sleeve 220 is disposed inside the sealed casing 214. The sealed casing 214 is affixed to a plate 256 of the ejector housing to be rotatably fixed. The sealed casing 214 has internal bearings 218 configured to reduce rotational friction between the sealed casing 214 and the first threaded sleeve 220. Additionally, the sealed casing 214 can include a first fixed end 235 and a second fixed end 230 that seal the casing 214 to prevent fluid from the tee pipe fitting 116 from entering the casing 214. In some implementations, the casing 214 can include rotatable sealing ends 243 and 241 that rotate with the first threaded sleeve 220 and add an additional sealing layer to the casing 214.

A valve mechanism 213 can open and close a valve 204 (for example, a ball valve) of the ejector assembly 106 to allow a portion of the first fluid 120 to flow into the ejector assembly 106. The valve 204 can be opened by actuating the mechanism 213 from outside the housing 110 using a handwheel 250 connected to a gearbox 242 that is connected to the valve mechanism 213. The valve mechanism 213 includes a sleeve 210 with a shaped hole (for example, a square hole) that receives a shaped rod 204 (for example, a square rod) such that rotating the sleeve 210 rotates the rod 208. Rod 204 slides within sleeve 210 as ejector assembly 106 is moved up and down. The rod 208 has one end coupled to the valve 204. To open and close the valve 204, sleeve 210 is rotated by hand wheel 250, allowing fluid 120 to flow into ejector assembly 106.

The ejector assembly 106, in the first position, is fluidically decoupled from the first fluid 120 in the first pipe 102. For example, when the ejector assembly 106 is inside the housing 110 above the circumference of the first pipe 102, the fluid 120 in the first pipe 102 can flow freely along the pipe 102 without being interrupted by the ejector assembly 106. Thus, by moving the ejector assembly 106 away from the fluid path of the first fluid 120, the tee pipe fitting 116 can function under normal operation. Additionally, an isolating plate 251 or door inside casing 110 and above main pipe 102 can isolate the components inside housing 100 from the fluid 120 flowing in the tee pipe fitting 116. Thus, movable design of the depressurizing system 100 can allow the components inside of the housing 110 to be maintained or replaced without interrupting the flow of fluids in the tee pipe fitting 116.

FIG. 3A illustrates the ejector assembly 106 engaged with the interface 108 to form a seal 302 between the branch pipe 104 and the main pipe 102. As described above with respect to FIG. 2, the threaded sleeves 220 and 210 can be rotated to lower the ejector assembly 106 into engagement at the interface 108. Once the ejector assembly 106 forms the seal 203 between the branch pipe 104 and the main pipe 102, the valve 204 can be opened, by the valve mechanism 213, to allow a portion of the first fluid 120 to enter the ejector assembly 106 through an inlet 202 of the ejector assembly. The ejector assembly has a nozzle 201 converging along a flow direction of the first fluid 120 to decrease the pressure of the first fluid 120 to a third pressure lower than the pressure of the second fluid 122 (see FIG. 1) in the branch pipe 104.

Figure 3B:
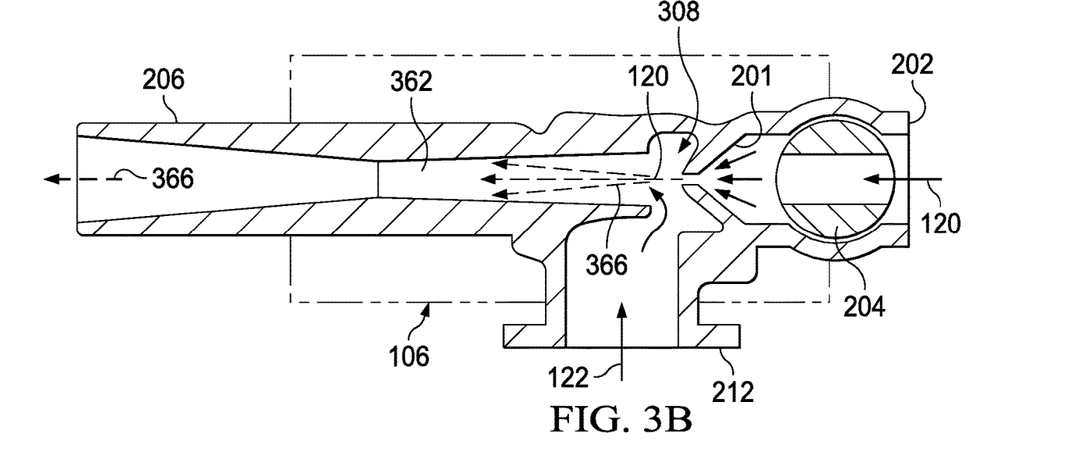
FIG. 3B is a top, cross-sectional view of an ejector assembly.

FIG. 3B illustrates in detail the components of the ejector assembly 106. The ejector assembly 106 has the inlet 202 and an outlet 206, the valve 204, the nozzle 201, the mixing chamber 308, and a diffuser 362. When the ejector assembly is engaged with the interface 108 (see FIG. 3A) and the valve 204 is opened, the first fluid 120 enters the ejector assembly 106 at the inlet 202. When the first fluid 120 enters the ejector assembly 106, the first fluid 120 flows into the nozzle 201, where the fluid 120 decreases in pressure. More specifically, the ejector assembly 106 works under the Bernoulli's principle in lowering the pressure of the first fluid 120 to draw the second fluid 122 out of the branch pipe 104. For example, as the flow rate of the first fluid 120 entering the nozzle 201 remains constant, the velocity of the first fluid 120 increases as the cross sectional area of the nozzle 201 decreases. As the velocity of the first fluid 120 increases, the pressure of the fluid 120 decreases directly proportional to the increase in speed of the first fluid 120. At the outlet of the nozzle 201, the first fluid 120, now at the third pressure, enters a mixing chamber 308. As the first fluid 120 enters the mixing chamber 308, the low pressure at the mixing chamber draws the second fluid 122 from the branch pipe 104 to mix with the first fluid 120. The mixing chamber 308 has an outlet 212 in fluid communication with the branch pipe 104 (see FIG. 1) such that flowing the first fluid 120 through the nozzle 201 draws the second fluid 122 from the branch pipe 104 into the mixing chamber 308. The first fluid 120 and the second fluid 122 mix at the mixing chamber 308 to form a mixed fluid 366. The mixed fluid 366 exits the mixing chamber through the outlet 206 of the ejector assembly 106 to mix with the rest of the first fluid 120 flowing in the first pipe. Thus, by drawing the second fluid 122 from the branch pipe 104, the branch pipe 104 can be depressurized without exposing the second fluid 122 in the branch pipe 104 to the environment.

Figure 4:
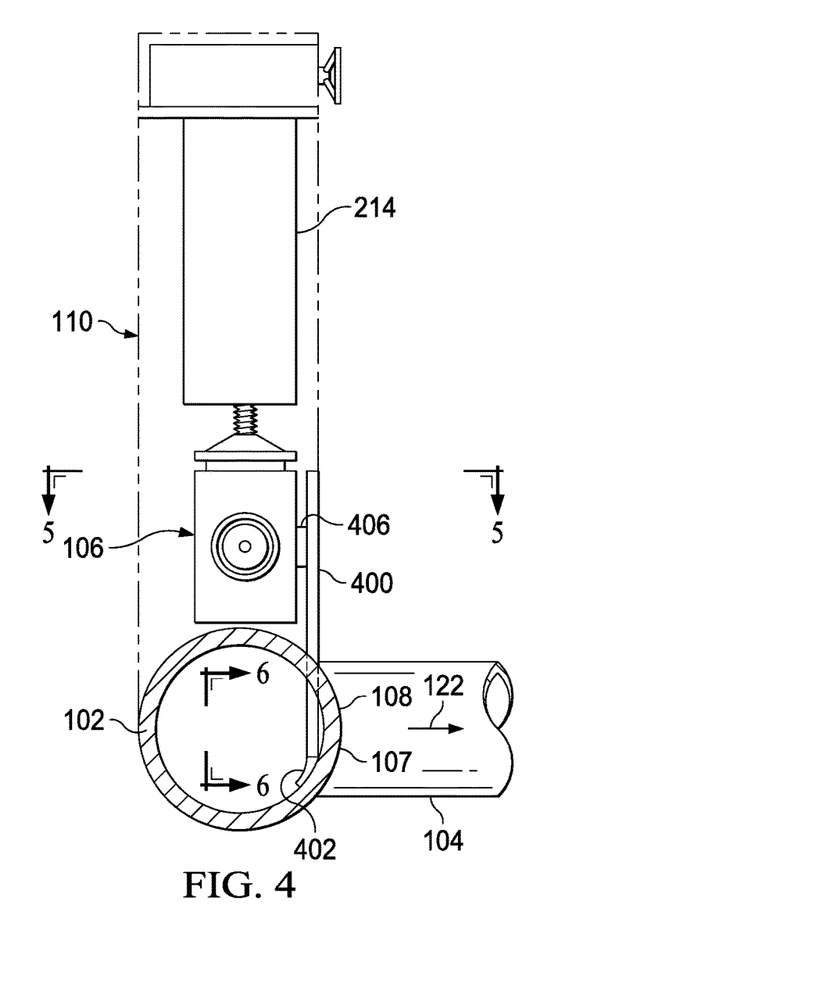
FIG. 4 is a side view of the depressurizing system of FIG. 2.
Figure 5:
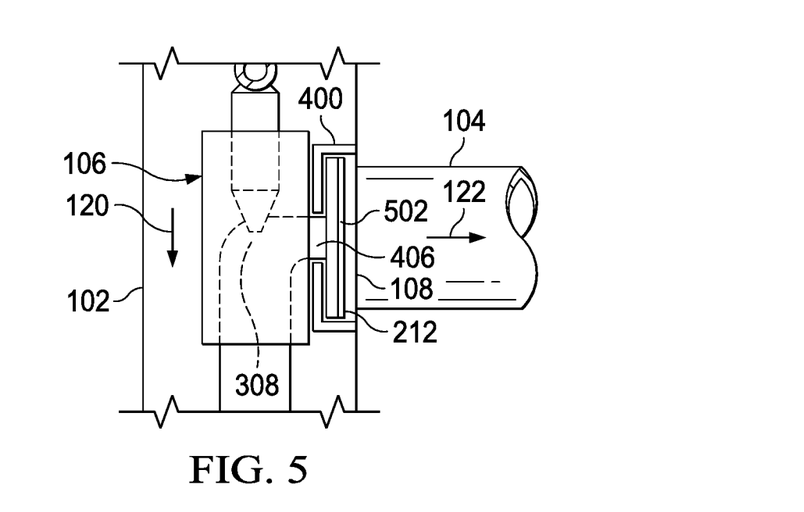
FIG. 5 is a cross-sectional view taken along line 5-5 in FIG. 4.
Figure 6:
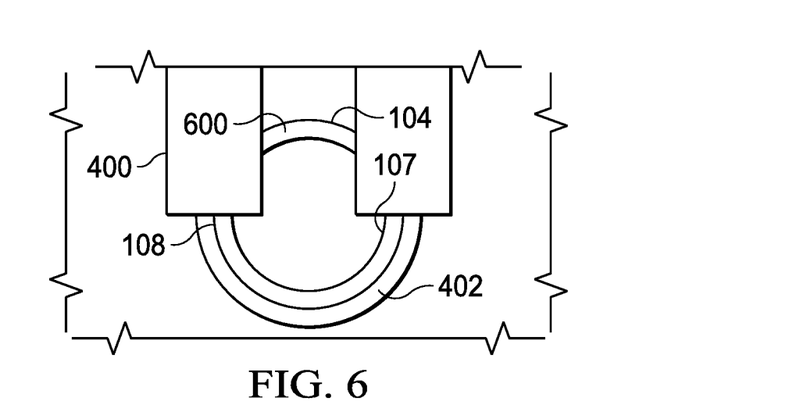
FIG. 6 is a detail view taken along line 6-6 in FIG. 4.

FIGS. 4-6 show a guiding rail 400 of the depressurizing system 100. The guiding rail 400 is disposed inside and coupled to the housing 110. As shown in FIG. 5, the guiding rail 400 guides the outlet 212 of the mixing chamber 308 downward in a straight line toward the interface 108 between the branch pipe 104 and the main pipe 102. In other words, the guiding rail 400 guides the outlet 212 toward the interface 108 to form the seal 302 (see FIG. 3A) with the inlet 107 of the branch pipe 104. Referring to FIGS. 4 and 5, a neck 406 of the outlet 212 extends from the mixing chamber of the ejector assembly 106 to be received by the rail 400. The rail 400 also receives a flange of the outlet 212 to constrain the outlet 212 to movement up and down along the length of the rail 400. Referring to FIGS. 5 and 6, the outlet 212 of the mixing chamber 308 includes a first sealing ring 502 that connects with a second sealing ring 600 (FIG. 6) at the inlet 107 of the branch pipe 104. Forming the seal 302 (See FIG. 3A) includes engaging the first sealing ring 502 with the second sealing ring 600. In some implementations, the pressure in the first pipe 102 can increase the strength of the seal 302 by pushing the first sealing ring 502 toward the second sealing ring 600. As shown in FIG. 6, a seat 402 is configured to support the outlet 212 of the mixing chamber 308 to connect the ejector assembly 106 to the interface 108 to form the seal 302. The seat 402 is secured to a bottom end of the guiding rail 400 adjacent the inner wall of the main pipe, on a bottom end of the inlet 107 of the branch pipe 104.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, or to about another particular value or a combination of them. When such a range is expressed, it is to be understood that another implementation is from the one particular value or to the other particular value, along with all combinations within said range or a combination of them.

Throughout this application, where patents or publications are referenced, the disclosures of these references in their entireties are intended to be incorporated by reference into this application, in order to more fully describe the state of the art to which the disclosure pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

That which is claimed is:

1. A method comprising:
  forming, by an ejector assembly and inside a tee pipe fitting, a seal between a first pipe and a second pipe fluidically coupled to the tee pipe fitting, the first pipe flowing a first fluid at a first pressure, the second pipe flowing a second fluid at a second pressure lower than the first pressure, the ejector assembly comprising:
    a nozzle converging along a flow direction of the first fluid flowing in the first pipe, and
    a mixing chamber at an outlet of the nozzle, the mixing chamber comprising an outlet that, with the seal formed, is in fluid communication with the second pipe; and
  flowing the first fluid from the first pipe into the ejector assembly through the nozzle, wherein the first pressure of the first fluid decreases to a third pressure lower than the second pressure drawing the second fluid from the second pipe into the mixing chamber.

2. The method of claim 1, wherein forming the seal comprises moving, by a moving assembly, the ejector assembly from a first position inside an ejector housing to a second position at an interface between the first pipe and the second pipe to form the seal, the ejector housing extending away from the first pipe adjacent the interface.

3. The method of claim 2, wherein the ejector assembly is, in the first position, fluidically decoupled from the first fluid in the first pipe.

4. The method of claim 2, wherein moving the ejector assembly from the first position to the second position comprises actuating the moving assembly from outside the ejector housing.

5. The method of claim 1, wherein the mixing chamber comprises a first sealing ring and an inlet of the second pipe comprises a second sealing ring, and wherein forming the seal comprises engaging the first ring with the second ring.

6. The method of claim 1, wherein flowing the first fluid into the ejector assembly comprises opening a valve of the ejector assembly.

7. The method of claim 6, wherein opening the valve comprises actuating a valve mechanism from outside the tee pipe fitting.

8. The method of claim 1, further comprising, after drawing the second fluid from the second pipe into the mixing chamber, undoing the seal between the first pipe and the second pipe.

9. The method of claim 8, wherein undoing the seal comprises:
  isolating the second pipe;
  interrupting the flowing of the first fluid into the ejector assembly; and
  moving the ejector assembly away from an interface between the first pipe and the second pipe.

10. A system comprising:
  an ejector moving gearbox assembly; and
  a movable ejector coupled to the ejector moving gearbox assembly and configured to be moved by the ejector moving gearbox assembly to form a seal, inside a tee pipe fitting, between a first pipe and a second pipe fluidically coupled to the tee pipe fitting, wherein the first pipe is configured to flow a first fluid at a first pressure and the second pipe is configured to flow a second fluid at a second pressure lower than the first pressure, the ejector comprising:

a nozzle converging along a flow direction of the first fluid to decrease the pressure of the first fluid to a third pressure lower than the second pressure, and a mixing chamber at an outlet of the nozzle, the mixing chamber comprising an outlet that, with the seal formed, is in fluid communication with the second pipe such that flowing the first fluid from the first pipe through the nozzle to the mixing chamber draws the second fluid from the second pipe into the mixing chamber.

11. The system of claim 10, further comprising a housing extending away from the first pipe adjacent the interface, the housing configured to house the ejector moving gearbox assembly.

12. The system of claim 11, wherein the ejector housing extends orthogonally, with respect to the first pipe and the second pipe, away from the first pipe.

13. The system of claim 11, further comprising a guiding rail inside the housing and configured to guide the outlet of the mixing chamber to an inlet of the second pipe to form the seal between the first pipe and the second pipe.

14. The system of claim 11, wherein the ejector is movable between a first position, inside the housing, and a second position at an interface between the first pipe and the second pipe to form the seal.

15. The system of claim 14, wherein in the first position, the ejector is fluidically decoupled from the first fluid in the first pipe.

16. The system of claim 11, wherein the ejector moving gearbox assembly comprises a gearbox disposed inside the housing, the ejector moving assembly configured to be actuated, through the gearbox, from outside the housing to move the ejector.

17. The system of claim 16, wherein the ejector moving gearbox assembly is configured to be actuated by applying torque, through the gearbox, to the ejector moving gearbox assembly, the torque applied by at least one of a motor and a handwheel.

18. The system of claim 16, wherein the ejector moving gearbox assembly comprises a threaded rod comprising a first end coupled to the ejector and a second end disposed inside and threadedly coupled to a threaded sleeve, the threaded sleeve rotatable about a longitudinal axis of the threaded rod to move the first end toward and away from the threaded sleeve.

19. The system of claim 18, wherein the threaded sleeve is disposed inside a sealed casing, the sealed casing affixed to the ejector housing and comprising bearings configured to reduce rotational friction between the sealed casing and the threaded sleeve.

20. The system of claim 10, wherein the movable ejector further comprises a valve configured to open a channel for the first fluid to flow into the nozzle.

\* \* \* \* \*